United States Patent [19]
Christoffel

[11] Patent Number: 5,562,322
[45] Date of Patent: Oct. 8, 1996

[54] DEVICE FOR CONNECTING A LONGITUDINAL BEAM OF A DEVICE SEAT TO THE VEHICLE STRUCTURE

[75] Inventor: Thomas Christoffel, Hüffler, Germany

[73] Assignee: Keiper Recard GmbH & Co., Remscheid, Germany

[21] Appl. No.: 397,488

[22] Filed: Mar. 2, 1995

[30] Foreign Application Priority Data

Mar. 15, 1994 [DE] Germany .................. 44 08 686.5

[51] Int. Cl.⁶ .................................................. B60N 2/10
[52] U.S. Cl. ...................... 296/65.1; 248/503.1; 297/336
[58] Field of Search .................... 296/63, 65.1; 297/336; 248/501, 503.1

[56] References Cited

U.S. PATENT DOCUMENTS

| | | | |
|---|---|---|---|
| 4,759,580 | 7/1988 | Berklich, Jr. et al. | 296/65.1 |
| 5,186,585 | 2/1993 | Sousa et al. | 296/65.1 X |
| 5,372,398 | 12/1994 | Aneiros et al. | 296/65.1 |

FOREIGN PATENT DOCUMENTS

3706395A1   8/1988   Germany .

*Primary Examiner*—David M. Mitchell
*Assistant Examiner*—Kia M. Robinson
*Attorney, Agent, or Firm*—Wigman, Cohen, Leitner & Myers, P.C.

[57] ABSTRACT

In a device for connecting a longitudinal beam (1) of a vehicle seat, especially a motor vehicle seat, to the vehicle structure (2) in a positively engaging manner both in the longitudinal direction of the seat and in the vertical direction, with a throat (7), which is provided on the longitudinal beam and is open toward the bottom and is intended to hold a bolt (5), which is provided on the vehicle structure (2), and a hook (9), which in its locking position reaches from the top behind the bolt (5) received by the throat (5), the hook (9) has a locking device (10, 13), which in its locking position holds the hook (9) in its release position. The locking device (10, 13) exhibits a releasing element (13), which can be moved by the bolt (5), entering into the throat (7), into a position, in which the locking device (10, 13) releases the hook (9).

13 Claims, 6 Drawing Sheets

DEVICE FOR CONNECTING A LONGITUDINAL BEAM OF A DEVICE SEAT TO THE VEHICLE STRUCTURE

BACKGROUND OF THE INVENTION

The invention relates to a device for connecting a longitudinal beam of a vehicle seat, especially a motor vehicle seat, to the vehicle structure.

In a known device of this kind (DE 37 06 395 A1), the connection between a motor vehicle seat and the floor structure of the motor vehicle seat is significantly simpler than with the use of screw connections. The front end section of the longitudinal beam, which is provided with a throat that is open toward the bottom and which bears or forms the bottom rail of the pair of rails that is usually used, has merely to be lowered in such a manner that the bolt associated with the throat enters the throat and swivels away the hook projecting into the throat. When the bolt has completely entered the throat, the hook can then grasp said bolt. One drawback of this device is that the connection can be disconnected only with difficulty, since access to the hook is bad. In addition, in this known device there are two bolts, pointing in the longitudinal direction of the beam, in the region of the rear end section of the longitudinal beam for the purpose of connecting to the floor structure of the motor vehicle. Each bolt has to be inserted into a borehole of a bracket of the floor structure. This insertion assumes an exact orientation.

OBJECTS AND ADVANTAGES OF THE INVENTION

In view of the problems associated with conventional devices, it is a principal object of the present invention to provide a device that overcomes the difficulties of the aforementioned kind, by making the connection between the vehicle seat and the vehicle structure much simpler. Another object of the present invention is to provide a device that enables the connection to be disconnected without any problems. Other objects and advantages of the present invention will become apparent from the description and drawings which follow.

SUMMARY OF THE INVENTION

Owing to the locking device, related to the hook, it is possible to hold the hook in its release position, a feature that is a prerequisite for a simple release of the connection. Nevertheless, when the first throat, which is provided in the region of the front end section of the longitudinal beam, is slid again onto the respective bolt of the vehicle structure, the hook moves into its locking position, because the releasing element of the locking device disengages the locking mechanism of the hook in its release position. In addition, connecting the rear end section of the longitudinal beam to the vehicle structure and disconnecting this connection, is extremely simple. To produce the connection, only the material part forming the upper flank of the throat provided on the rear end section of the longitudinal beam has to be laid on the respective second bolt; and then the longitudinal beam has to be pushed to the rear, until the front throat is aligned with the front bolt. In so doing, the bolt is inserted far into the second throat.

Therefore, the material part of the longitudinal beam forming the upper flank of the second throat projects preferably to the rear beyond the material part forming the bottom flank. Because the front end section has to be elevated while producing the connection at the rear end section of the longitudinal beam, it is, moreover, advantageous if the upper flank of the second throat forms an acute angle with the longitudinal center line of the second throat.

So that a connection with virtually no play is achieved between the longitudinal beam and the second bolt, an upper contact surface adjoins itself in a preferred embodiment to the guide surface extending at an acute angle to the longitudinal center line of the second throat. Thus, a contact surface changes over into the surface forming the throat base and extends parallel to the longitudinal center line of the second throat, whereby the distance from the bottom flank of the second throat extending parallel to said surface is adapted to the diameter of the second bolt. Owing to the guide surface, it is possible to insert the second bolt into the second throat without any problems even with this tight fit.

The locking device allocated to the hook is designed preferably as a swivelable lever, whose swivel axis is parallel to the hook's swivel axis. Furthermore, the spring loading the hook can be designed as a tension spring, which, on the one hand, engages with the hook and, on the other hand, with the swivelable lever. Then one single spring suffices to swivel the hook, following release, into the locking position and to move the lever forcibly into its locking position, when the hook is swivelled into its release position.

In a preferred embodiment the rocking lever is a dual armed lever, whose one arm is designed as a pawl, which grasps a latching element of the hook in the release position of the hook. The other arm forms then the releasing element, whose at least one outer region crosses the extension of the channel that lies laterally next to the hook and defines the throat, when the hook is located in the release position and is held in said position by the dual armed lever. In the following the crossing of this extension is short formed to a crossing of the throat.

However, the swivelable lever can also be designed in such a manner that its free end forms in the release position of the hook a stop, located in the swivel path of the hook; and at least the outer region of the rocking lever crosses in this position the first throat next to the hook.

So that the hook can be swivelled into its release position without any problems in order to disconnect the connection, the hook is operatively connected to an actuator, which could be, for example, a traction rope. Preferably, however, the actuator is designed as a lever, to which a handle is hinged. This lever can be actuated only if the hand lever is swivelled out of a non-use position, in which it is in a depression of the longitudinal beam, into a use position, in which it projects laterally beyond the longitudinal beam.

Thus, the present invention presents a large number of advantages of conventional devices. The installation of a vehicle seat, which is provided with the device according to the invention and which can be used both as a driver seat and as a passenger seat and as a rear seat, is very simple. Thus, during installation no operating element has to be actuated and the locking follows automatically. When used as a passenger seat, installation in a position rotated by 180° is also possible, providing a position in which the passenger looks toward the rear seat. Even the disassembly of such a seat is simple, to which end then, when there is a lever with a handle that can be folded down for the purpose of releasing the locking mechanism, only the handle has to be folded down out of the non-use position and pulled upward. While at the same time the hook is swivelled into its release position, the respective locking device pushes from the top on the bolt and thereby lifts the seat. This lifting indicates, first of all, where and in what direction the seat has to be lifted next for the purpose of removal. Secondly, when a person is sitting on the seat, the hook is prevented by the person's weight from swivelling into the unlocking position. After the hook has been swivelled into its release position and has been locked by the locking device in said release position, no more elements have to be actuated in order to remove the seat. Since the locking element is automatically disconnected during the installation of the seat and the hook is automatically swivelled into the locking position, it is guaranteed that the seat can be used only when said seat is connected properly to the vehicle. If a lever with hinged handle exists as the actuator, there is the added safety measure that the hook cannot be swivelled into the release position, as long as the handle is not swivelled into the use position projecting sideways over the longitudinal beam. This use position indicates, first of all, to the eye that the, seat is not connected properly to the vehicle. Secondly it ensures that with the door closed the locking mechanism cannot be unlocked; thus the seat can be taken out and put in only when the door is open; and that the door cannot be closed as long as the handle is in a position, in which the seat is not connected properly to the vehicle.

BRIEF DESCRIPTION OF THE DRAWINGS

The invention is explained in detail with reference to the embodiments illustrated in the drawings, wherein.

DETAILED DESCRIPTION OF THE PREFERRED EMBODIMENTS

Figure 1:
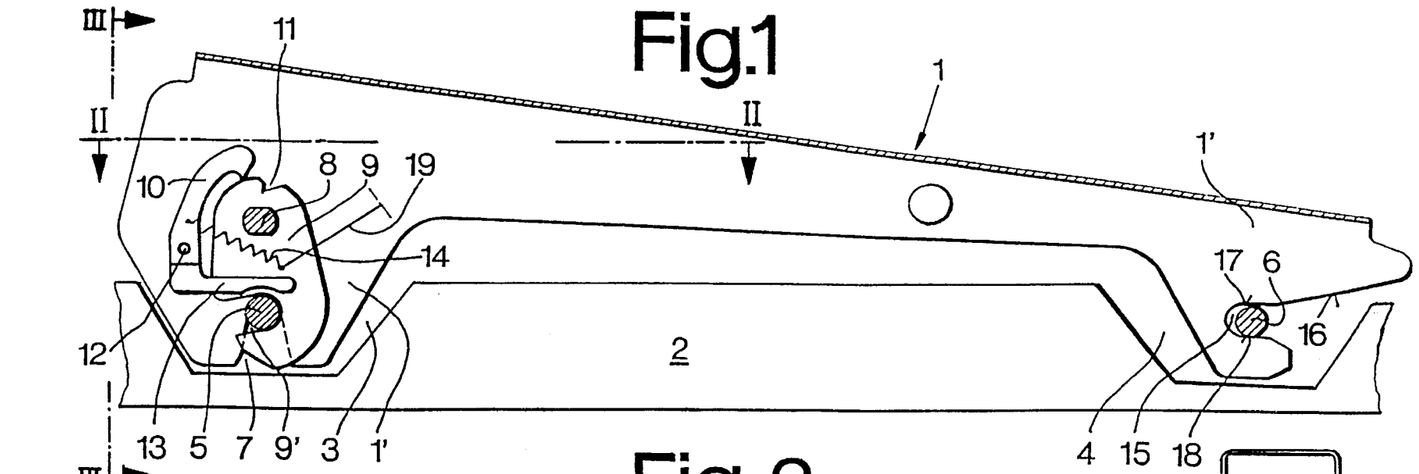
FIG. 1 is a longitudinal elevational view of a first embodiment of the present invention taken along line I—I of FIG. 2.

Referring now to the drawings wherein like numerals indicate like elements throughout the several views, in FIG. 1, there is seen a longitudinal beam 1 for a motor vehicle seat. Beam 1 has a U-shaped cross-sectional profile, open toward the bottom, and includes a pair of spaced legs 1', 1' which differ in depth along its length. The legs 1', 1' form the bottom rail of a pair of rails, but could also be designed in one piece as a bottom rail, which serves as the connection of a motor vehicle seat to the floor structure 2 of a motor vehicle. In this embodiment, floor structure 2 is provided with two depressions 3 and 4, which are offset in the longitudinal direction of the vehicle. In the front depression 3 a first bolt 5 is arranged at a distance from the base of said depression. Similarly, in the rear depression 4 a second bolt 6 is arranged at a distance from the base of said depression. Bolts 5 and 6 are parallel to the base of the depression 3 or 4, which also lies in a horizontal plane, transverse to the longitudinal axis of the vehicle, and serve to connect the longitudinal beam 1 to the floor structure 2. For this reason, all of the forces, acting on the motor vehicle seat, are introduced into the floor structure 2.

The two legs 1', 1' are parallel, substantially identical and shaped to conform to the profile shape of the depression 3 so that this front end section can engage with the front depression 3. In so doing, the first bolt 5, located in the front depression 3, engages with a first throat 7, which is open toward the bottom for receiving the two legs 1', 1'. To facilitate the mounting of the first throat 7 on the first bolt 5, the first throat 7 expands toward the bottom in the direction of its open end. However, the width of the upper end section is adapted to the diameter of the first bolt 5, so that it is situated without play in the first throat 7, when said throat has totally accommodated the first bolt 5.

A swivel pin 8, to which hook 9 is connected so as to prevent rotation, is mounted on the legs 1', 1' at a distance above the first throat 7 and parallel thereto. The throat 9' of hook 9 is designed in such a manner that it receives the first bolt 5 and, in so doing, can reach behind with its bottom flank, when the first bolt 5 enters totally into the first throat 7. In the locking position, in which the first bolt is grasped from behind and which is shown in FIG. 1, the hook 9 rests without play against the first bolt 5. For this reason, when the hook 9 is in its locking position, the longitudinal beam 1 is positively connected to the first bolt 5 not only toward the front and rear and bottom, but also toward the top.

Figure 2:
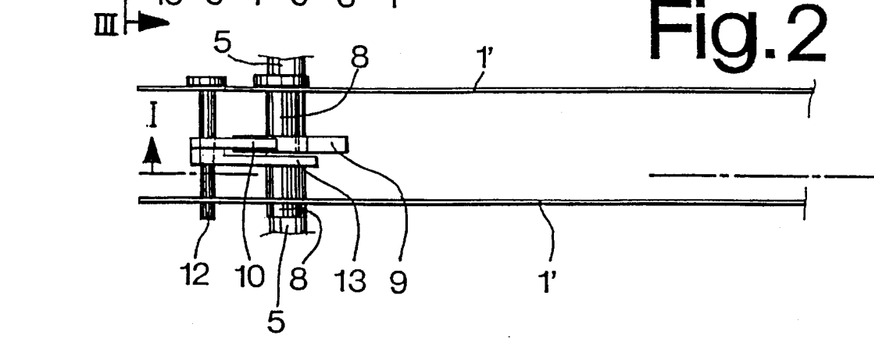
FIG. 2 is a longitudinal plan view of a first embodiment of the present invention taken along line II—II of FIG. 1.
Figure 3:
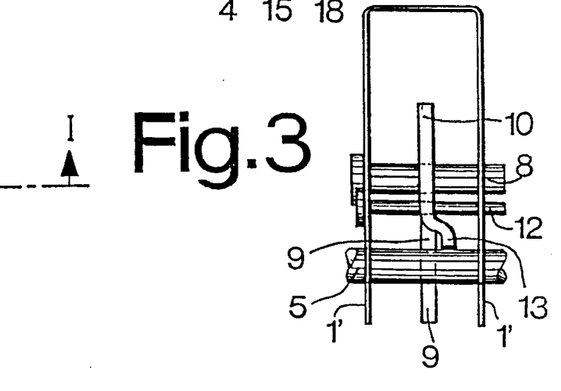
FIG. 3 is a end view of the embodiment of FIG. 1, as seen from the left side in the direction of arrow III in FIG. 1.

To disconnect the connection between the front end section of the longitudinal beam 1 and the first bolt 5, the hook 9 has to be swivelled counterclockwise out of its locking position, in which the hook end, bordering the throat 9' of the hook at the bottom of the hook, crosses the first throat 7, in the direction of sight according to FIG. 1 into the release position, in which the hook 9 does not engage with the first throat 7. In this release position (not shown), a pawl 10, which forms a locking device, reaches into a groove 11 of the hook 9, which is provided in the outer portion of the hook 9 and above the swivel pin 8. The pawl 10 is formed by means of an arm of a dual armed rocking lever, which is pivot-mounted on the longitudinal beam 1 with axle 12, which is parallel to the swivel pin 8. A releasing element 13, formed by the other arm of the dual armed rocking lever extends at approximately right angles to the pawl 10, and traverses hook 9 below the swivel pin 8. Since the releasing element 13 next to the hook 9 and the pawl 10 axis lies in the plane of the hook 9, the center section of the dual armed lever is bent or displaced, as shown in FIGS. 2 and 3.

In the locking position of the hook 9 and the release position of the pawl 10, as shown in FIG. 1, there is space between the first bolt 5 and the releasing element 13 crossing said bolt at the top. However, the releasing element 13 which assumes a horizontal position in the releasing position, moves into a position, which slopes to the rear and bottom and in which it crosses the first throat 7, when the hook 9 is moved into its release position. The pawl 10 then drops into the groove 11, thus swivelling the dual armed rocking lever clockwise in the direction of sight according to FIG. 1. This swivel movement is effected by means of a prestressed tension spring 14, which engages above the axle 12 of the dual armed lever at pawl 10 and at a distance below swivel pin 8 at hook 9. Tension spring 14 also effects the swivel movement of the hook 9 in its locking position, when as the first bolt 5 penetrates the first throat 7, the first bolt rests against the releasing element 13 and swivels it to the top, as seen in the direction of sight according to FIG. 1, thus counterclockwise, whereby the pawl 10 disengages with the groove 11. Thus, it is guaranteed that, when the hook 9 is in its release position, it is swivelled automatically into the locking position, when the longitudinal beam 1 is mounted on the first bolt 5 and said bolt has totally penetrated the first throat 7.

The rear end section of the longitudinal beam 1 forms a second throat 15, which is open toward the rear and which can receive the second bolt 6 without play. The material part of the two profile legs 1', 1' that forms the upper flank of the second throat 15 forms a guide surface 16, which extends as far as the rear end of the longitudinal beam 1 and forms an acute angle with the longitudinal center line of the second throat 15. An upper contact surface 17, which extends as far as the base of the throat, adjoins this guide surface 16. Parallel to said contact surface is a bottom contact surface 18, whose distance from the upper contact surface 17 is chosen identical to the diameter of the second bolt 6, so that said bolt is located in the vertical direction without play in the second throat 15. A surface, which slopes to the bottom and to the rear and which forms together with the guide surface 16 an insertion funnel, adjoins the bottom contact surface 18.

To produce the connection of the longitudinal beam 1 to the second bolt 6, the guide surface 16 is placed over the second bolt 6 and then the longitudinal beam 1 has to be slid to the rear until the first throat 7 is aligned with the first bolt 5. In so doing, the second bolt 6 automatically engages with the second throat 15. At this stage only the front end of the longitudinal beam 1 has to be lowered until the first bolt 5 has totally entered into the first throat 7.

To release the longitudinal beam 1 from the floor structure 2, hook 9 is swivelled by means of a traction rope 19, which engages with the hook 9. Alternatively, another actuator (not shown) for engagement with the hook 9 can be provided in which, in the release position, the hook 9 is held rigidly by the pawl 10. The longitudinal beam 1 can then be lifted at the front and slid towards the front, permitting the second bolt 6 to exit the second throat 15, and releasing the longitudinal beam 1.

Figure 4:
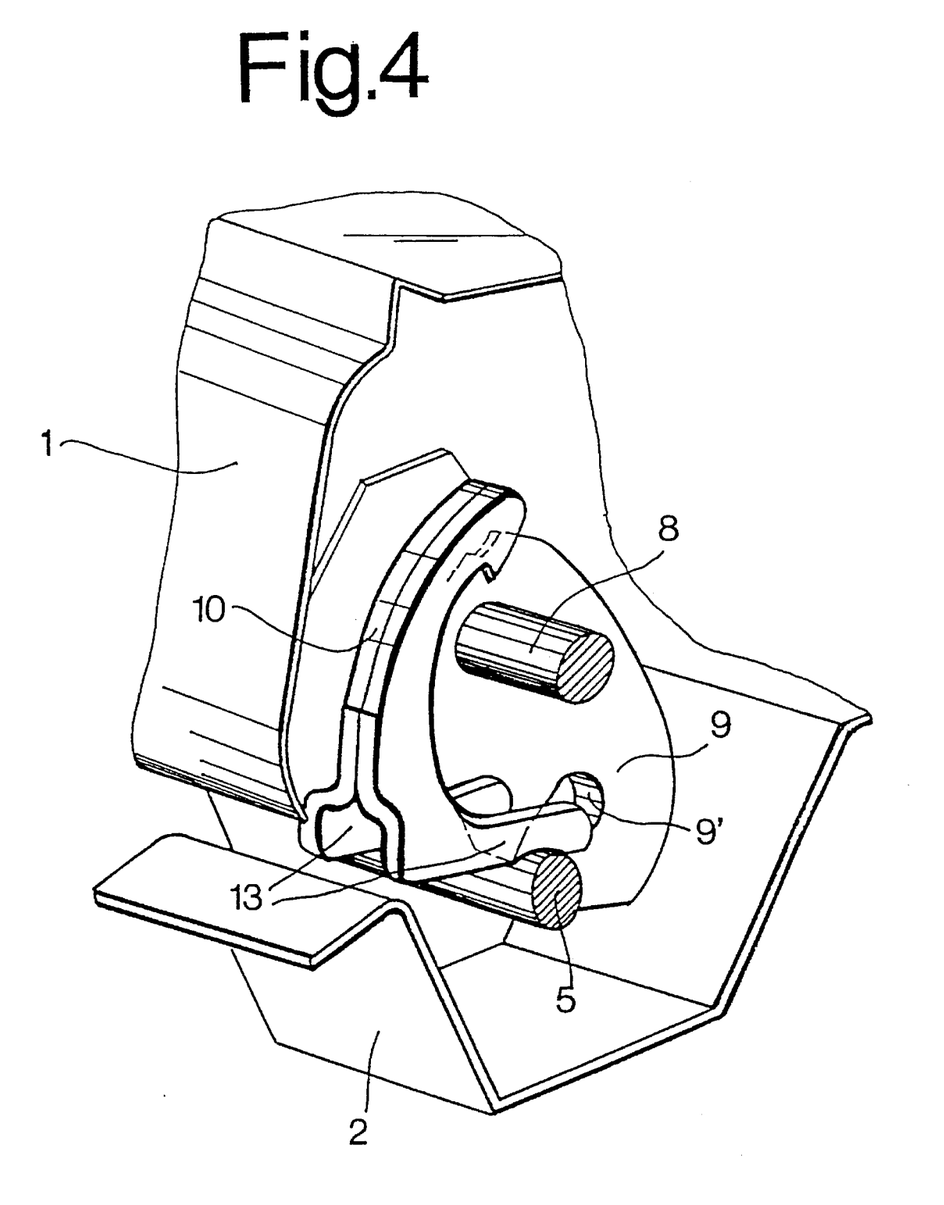
FIG. 4 is a perspective view in part of a modification of the embodiment according to FIGS. 1 to 3.

As shown in FIG. 4, the second! lever arm comprise two parts 13, 13, which are identical mirror-images of each other and which are also preferably punched parts, as in the case of the hook 9. As shown in the modified embodiment of FIG. 4, all faces of said punched parts rest against each other in the region of the arms forming the pawl 10. In contrast, the two releasing elements 13, 13 are spaced apart owing to their being bent twice. The distance between releasing elements 13, 13 is somewhat larger than the thickness of the hook 9. Thus, hook 9 can enter between the two releasing elements 13, 13.

Figure 5:
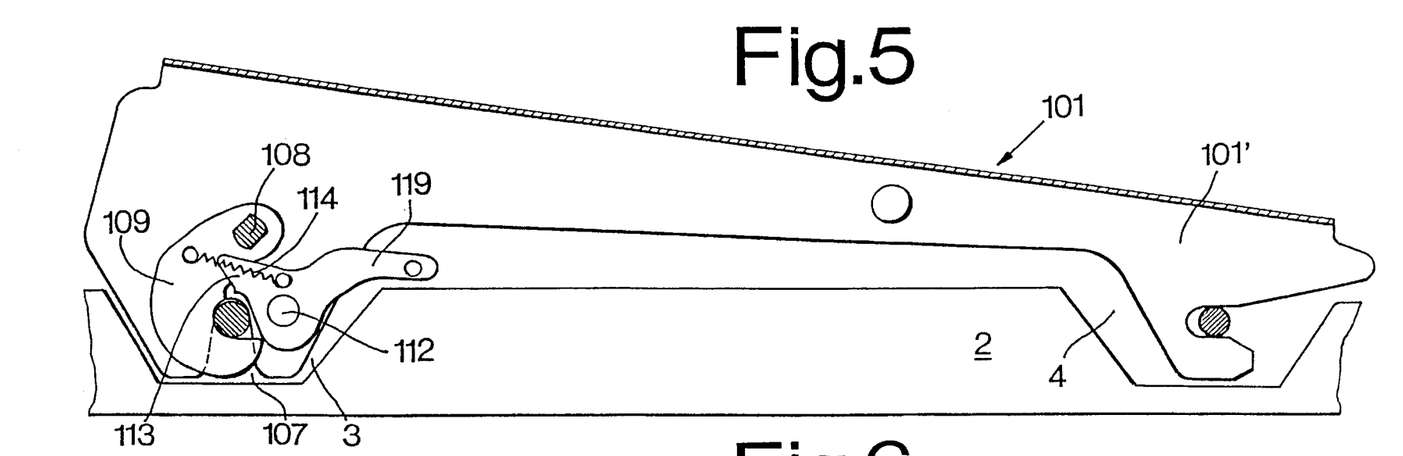
FIG. 5 is a longitudinal elevational view of a second embodiment of the present invention including a produced connection.
Figure 6:
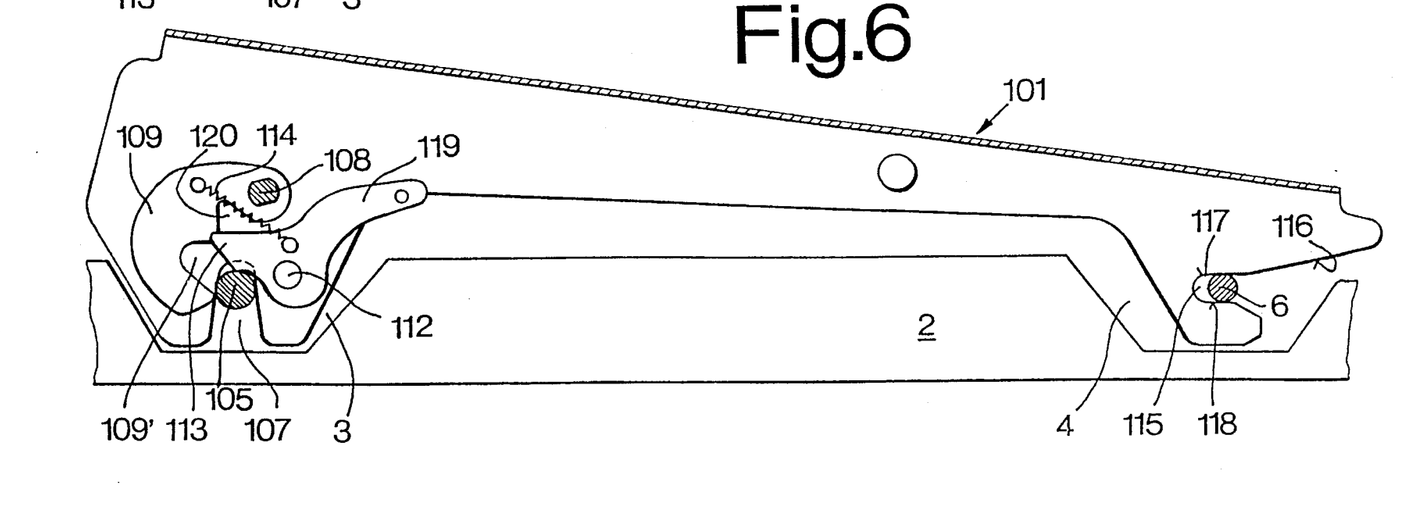
FIG. 6 is a longitudinal elevational view of the second embodiment of FIG. 5, in the released position.

The major distinction between the embodiment shown in FIGS. 5 and 6 and that shown in FIGS. 1 to 3 is the design of the locking device for the hook 109, and the releasing element. Therefore, the description for the FIGS. 5 and 6 embodiment will be only for the non-conforming parts. The reference numerals applied are the same for FIGS. 1 to 3 except they are increased by 100.

As FIGS. 5 and 6 show, a releasing element 113 is pivot-mounted on an axle 112 at a distance next to the upper end section of the first throat 107, which is open toward the bottom and which is provided, as in the embodiment according to FIGS. 1 to 3, in the downwardly oriented profile legs 101' of the front end section of the longitudinal beam 101. The releasing element 113 forms an arm, which tapers conically in the direction of its free end and which points toward the center section of the hook 109. As in the first embodiment, the hook 109 can be pivoted between the profile legs 101' of the longitudinal beam 101 by means of a swivel pin 108, arranged above the first throat 107, and in particular in such a manner that with a swivel movement out of its release position said hook moves toward the axle 112 into the locking.

In FIG. 6, the center section of the hook 109 is provided with a groove 120, whose profile is wedge-shaped and is open in the direction of the releasing element 113 and whose profile is adapted to that of the end section of the releasing element 113, which engages with the groove 120 in the locking position of the hook 109.

A second arm 119, which forms an actuator for the releasing element 113, is connected in one piece to the releasing element 113. When arm 119 is pivoted counterclockwise in a direction of sight in accordance with FIGS. 5 and 6, the releasing element 113 exerts a torque on the hooks 109 in the sense of a movement into the release position, causing the releasing element 113 to move more and more out of the groove 120. When the release position of the hook 109 is reached, as shown in FIG. 6, the free, rounded off end of the releasing element 113 enters a small depression of the hook 109, which is provided between the groove 120 and the throat 109' of the hook.

In this swivel position the bottom outer region of the releasing element 113 crosses the first throat 107 below the base of the throat, as shown in FIG. 6. Therefore, when the first throat 107 is slid on the first bolt 104, the releasing element 113 is pushed upwardly by said bolt, thus swivelled clockwise in the direction of sight according to FIG. 6. In so doing, the free end of the releasing element 113 disengages with the small depression and engages with the groove 120. A prestressed tension spring 114, which is attached, on the one hand, to the hook 109 and, on the other hand, to the releasing element 113, swivels the hook 109 into a locking position. In so doing, the free end section of the releasing element 113 penetrates totally into the groove 120.

The connection between the rear end section of the longitudinal beam 1 and the second bolt 6 is designed in the same manner as in the first embodiment. Therefore, the description concerning the first embodiment is applicable here.

Figure 7:
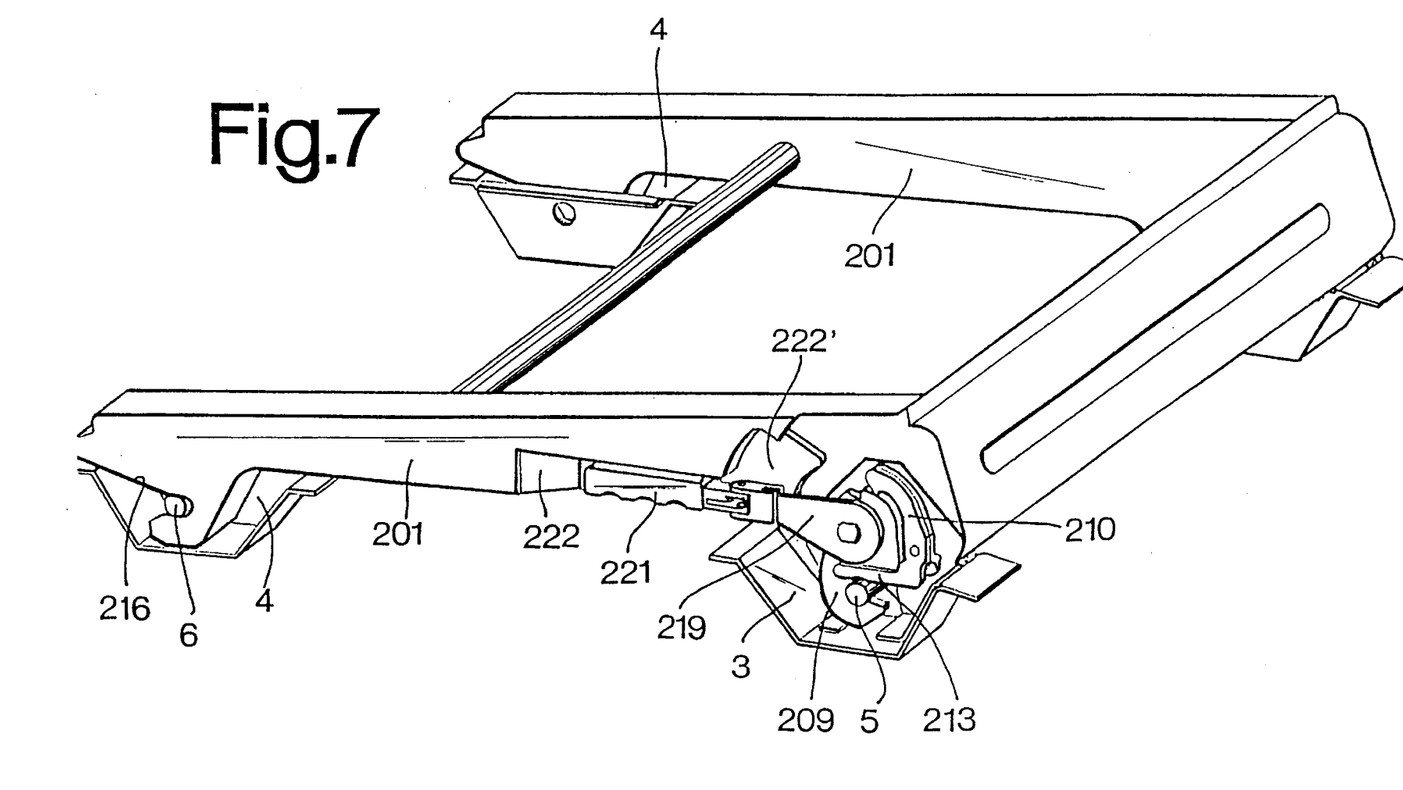
FIG. 7 is a perspective view of a third embodiment of the present invention when connected to the vehicle.
Figure 8:
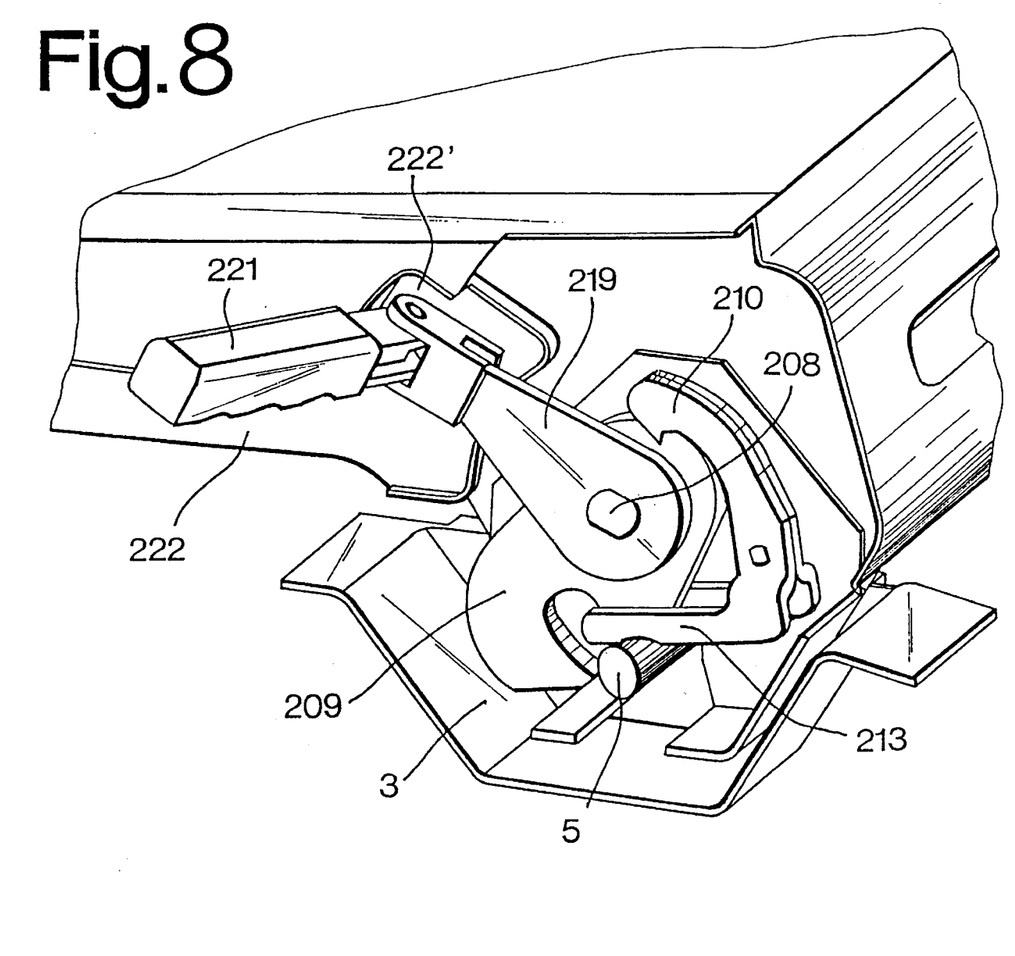
FIG. 8 is a perspective view of the third embodiment of the present invention when disconnected from the vehicle.
Figure 9:
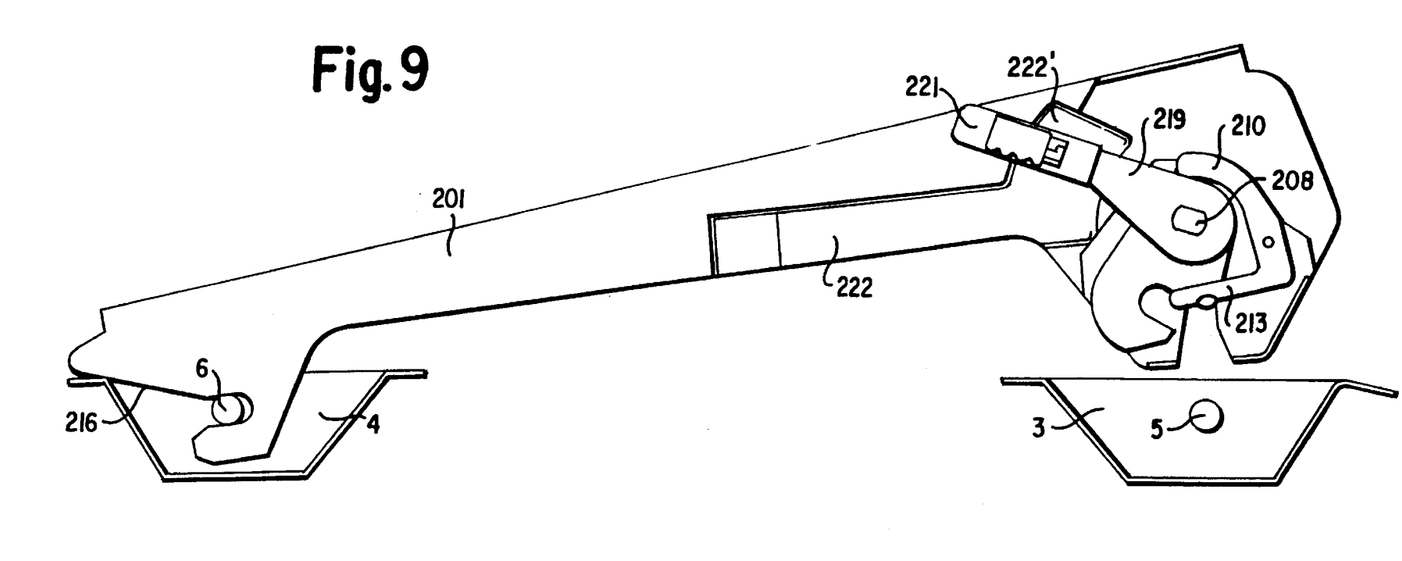
FIG. 9 is a side elevational view of the third embodiment of the present invention with its end in a lifted condition.

A third embodiment of the present invention is shown in FIGS. 7 to 9 and differs from the embodiments described above in that a different design of the actuator for the hook 209 is used. Therefore, the corresponding parts are marked with reference numerals greater by 200 or 100 than in the first or second embodiment.

An operating lever 219, to whose end facing the swivel pin 208 is hinged a bar-shaped handle 221 with swivel axis extending at right angles to the swivel pin 208, is connected so as not to rotate to the swivel pin 208, to which the hook 209 is connected so as not to rotate. A prestressed spring (not illustrated) holds the handle 221 in a position in which the handle extends in the longitudinal direction of the operating lever 219, as shown in FIG. 7. Handle 221 can assume this non-use position only when it can enter into a depression 222 of the longitudinal beam 201, said depression being open toward the bottom and toward the front.

To swivel the hook 209 into the release position shown in FIGS. 8 and 9, the handle 221 must be swivelled first out of the depression 222 into a position, in which it extends approximately parallel to the swivel pin 208. However, in this position it can be swivelled only if the vehicle door is opened, since the length of the handle 221 is chosen suitably large. This feature ensures that the seat can be assembled and disassembled only when the door is open and thus when the vehicle is standing.

After the handle 221 has been swivelled out of the depression 222, it has to be moved upwardly into the position shown in FIG. 8, in order to swivel the hook 209 into the release position. In this position the end of the handle 221 that is connected to the operating lever 219 projects into an extension 222' of the depression 222 that extends upwardly, whereby the handle 221 is held approximately parallel to the swivel pin 208, even though a prestressed spring (not illustrated) tries to swivel said handle into that position, in which it lies in the longitudinal stretch of the operating lever 219.

When the hook 209 is swivelled into its release position, the pawl 210 is swivelled counterclockwise in the direction of sight according to FIGS. 7 to 9. Since the releasing element 213 pushes from the top against the bolt 205, the longitudinal beam 201 moves upwardly in the region of its front end. The force that is required for this lifting of the seat is so high, that the hook 209 can be swivelled into its release position only when there is no load on the seat. This feature gives an additional guarantee that the connection between the seat and the vehicle cannot be disconnected during the trip.

As in the earlier embodiments, following the production of the connection between the rear end of the longitudinal beam 201 and the rear bolt 206 as the front end of the longitudinal beam 201 is lowered, the releasing element 213 is moved toward the swivel pin 208 by the front bolt 205, entering the throat 207, whereby the pawl 210 releases the hook 209. Due to the spring (not illustrated), which corresponds to the springs 14 and 114 and which engages with the hook 209 and the pawl 210, the hook is swivelled into its locking position, in which said hook grasps behind the front bolt 205. During this swivel movement, the operating lever 219 is also swivelled in the same direction. Thus, the handle 221 is aligned with the depression 222, into which it automatically falls.

FIG. 9 shows in particular, that the depression 4 of the floor structure 2 is designed in such a manner that the rear end of the longitudinal beam 201 can rest on the floor structure, only when the guide surface 216 rests against the rear bolt 6. Since the seat exhibits, as shown in FIG. 7, two longitudinal beams 201, which are designed identically as mirror images of each other, their rear end is braced against the floor structure when the seat is being installed, thus preventing the seat from tilting to the side.

As a consequence of the identical design of the depressions 3 and 4 for both longitudinal beams 201 and the identical design of the bolts 5 and 6 in the depressions, this seat can also be installed rotated by 180°, if desired.

For additional details of this embodiment, the description concerning the embodiments according to FIGS. 1 to 6, is applicable here.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed:

1. Device for connecting a longitudinal beam of a vehicle seat, especially a motor vehicle seat, to a vehicle structure in a manner that is positively engaged in both the longitudinal direction of the seat and in the vertical direction, comprising:

a) a first throat, in the region of a from end section of the longitudinal beam that is open toward the bottom for receiving a bolt provided from the vehicle structure which extends in the cross direction of the seat;

b) a spring-loaded hook having a swivel axis and swivelably extending from the longitudinal beam for engaging said bolt;

c) at least one plug-in connection element for interacting with a counter element on the structure of the vehicle;

d) a locking device which cooperates with the hook to hold the hook in a locked position in a manner permitting the bolt to enter and exit the first throat when the hook is in the locked position;

e) said locking device including a releasing element movable by the bolt, when the seat is subjected to a load, into a position in which the locking device is released; and f) a second throat in a region of the rear end of the longitudinal beam that is open toward the rear for receiving a second bolt forming the counter element and which lies parallel to the first bolt.

2. Device, as recited in claim 1, wherein a material part of the longitudinal beam forming art upper flank of the second throat projects toward the rear beyond a material part forming a bottom flank and forms a guide surface, which extends at an acute angle to the longitudinal center line of the second throat for the second bolt.

3. Device, as recited in claim 2, wherein an upper contact surface adjoins the guide surface; said contact surface changes over into a surface forming a throat base and extends parallel to the longitudinal center line of the second throat and has a distance from a bottom contact surface, which is formed by the throat base and also extends parallel to the longitudinal center line of the second throat, resulting in the second bolt being held in the second throat without appreciable play.

4. Device, as recited in claim 1, wherein the locking device is a swivelable lever, whose swivel axis is parallel to the swivel axis of the hook.

5. Device, as recited in claim 4, wherein the spring, loading the hook is a tension spring, one end of said spring engages the hook at a distance from the swivel axis of the hook, the other end of said spring engages the lever at a distance from the swivel axis of the lever.

6. Device, as recited in claim 4, wherein said locking device includes a rocking lever with two arms, one arm being a pawl for engaging a latching element of the hook, when said hook is in a release position, the other arm being said releasing element.

7. Device, as recited in claim 5, wherein said locking device includes a rocking lever with two arms, one arm being a pawl for engaging a latching element of the hook, when said hook is in a release position, the other arm being a releasing element.

8. Device, as recited in claim 4, wherein a free end of the rocking lever forms a stop in the release position of the hook.

9. Device, as recited in claim 5, wherein a free end of the rocking lever forms a stop in the release position of the hook.

10. Device, as recited in claim 1, further including an actuator, which engages with the hook and swivels the hook from a locking position into a release position.

11. Device, as recited in claim 10, wherein said actuator includes an operating lever, which is connected to the hook and provided with a handle pivotally-mounted on said lever.

12. Device, as recited in claim 11, wherein said longitudinal beam includes a lateral depression to engage said actuator handle in its non-use position.

13. Device, as recited in claim 1, further including an actuator which engages with a rocking lever and swivels the hook from a locking position into a release position.

* * * * *